(12) United States Patent
Grebovich

(10) Patent No.: US 11,108,811 B2
(45) Date of Patent: Aug. 31, 2021

(54) METHODS AND DEVICES FOR DETECTING DENIAL OF SERVICE ATTACKS IN SECURE INTERACTIONS

(71) Applicant: Avaya Inc., Santa Clara, CA (US)

(72) Inventor: Dragan Grebovich, Amesbury, MA (US)

(73) Assignee: Avaya Inc., Santa Clara, CA (US)

( * ) Notice: Subject to any disclaimer, the term of this patent is extended or adjusted under 35 U.S.C. 154(b) by 103 days.

(21) Appl. No.: 15/877,140

(22) Filed: Jan. 22, 2018

(65) Prior Publication Data
US 2019/0230114 A1    Jul. 25, 2019

(51) Int. Cl.
*H04L 29/06*   (2006.01)
*H04L 29/08*   (2006.01)
(Continued)

(52) U.S. Cl.
CPC ....... *H04L 63/1458* (2013.01); *G06Q 20/102* (2013.01); *G06Q 20/223* (2013.01);
(Continued)

(58) Field of Classification Search
CPC . H04L 63/1458; H04L 9/0637; H04L 9/0861; H04L 67/104; H04L 63/0823;
(Continued)

(56) References Cited

U.S. PATENT DOCUMENTS

| | | | |
|---|---|---|---|
| 2015/0220890 A1* | 8/2015 | Seshadri | H04L 63/0281 |
| | | | 705/44 |
| 2015/0356555 A1* | 12/2015 | Pennanen | G06Q 20/06 |
| | | | 705/71 |

(Continued)

FOREIGN PATENT DOCUMENTS

| | | |
|---|---|---|
| EP | 2953076 | 12/2015 |
| JP | 2006-521724 | 9/2006 |

(Continued)

OTHER PUBLICATIONS

Nijeholt et al., "DecReg: A Framework for Preventing Double-Financing using Blockchain Technology", Proceedings of the ACM Workshop on Blockchain, Cryptocurrencies and Contracts, pp. 29-34, Apr. 2017.*

(Continued)

*Primary Examiner* — Morshed Mehedi
(74) *Attorney, Agent, or Firm* — Sheridan Ross P.C.

(57) ABSTRACT

At least one example embodiment is directed to a method of preventing a denial of service attack on a network that includes receiving a request from a first entity to initiate a blockchain operation on behalf of the first entity and a second entity; and generating, in response to receiving the request, a prompt including at least one condition that is associated with the blockchain operation. The method includes sending a first message that includes the prompt to the first entity; and receiving a second message that includes an indication of whether the at least one condition has been satisfied or is authorized to be satisfied. The method includes determining whether the request from the first entity is attempting the denial of service attack or is issuing a legitimate request, and facilitating the blockchain operation upon satisfaction of the at least one condition.

20 Claims, 6 Drawing Sheets

(51) Int. Cl.
*G06Q 20/22* (2012.01)
*H04L 9/08* (2006.01)
*H04L 9/06* (2006.01)
*G06Q 20/10* (2012.01)

(52) U.S. Cl.
CPC .......... *H04L 9/0637* (2013.01); *H04L 9/0861* (2013.01); *H04L 63/0823* (2013.01); *H04L 63/1416* (2013.01); *H04L 67/104* (2013.01)

(58) Field of Classification Search
CPC ... H04L 63/1416; H04L 67/10; G06Q 20/102; G06Q 20/223
See application file for complete search history.

(56) References Cited

U.S. PATENT DOCUMENTS

| | | | |
|---|---|---|---|
| 2016/0261411 | A1 | 9/2016 | Yau et al. |
| 2017/0017958 | A1* | 1/2017 | Scott ................... G06Q 20/40 |
| 2017/0256003 | A1 | 9/2017 | Isaacson et al. |
| 2018/0150816 | A1* | 5/2018 | Liu ..................... G06Q 20/202 |
| 2018/0181768 | A1* | 6/2018 | Leporini ............. G06F 21/6209 |
| 2018/0218456 | A1* | 8/2018 | Kolb ................... G06Q 20/102 |
| 2018/0240165 | A1* | 8/2018 | Kilpatrick ............. G06Q 30/04 |
| 2018/0276666 | A1* | 9/2018 | Haldenby ............... H04L 63/10 |
| 2018/0330342 | A1* | 11/2018 | Prakash ............... G06Q 20/065 |
| 2018/0337771 | A1* | 11/2018 | Baker ................... H04L 9/3236 |
| 2019/0014124 | A1* | 1/2019 | Reddy ................... H04L 63/108 |
| 2019/0158487 | A1* | 5/2019 | Hayes ................ H04L 63/0807 |

FOREIGN PATENT DOCUMENTS

| | | |
|---|---|---|
| JP | 2006-527430 | 11/2006 |
| JP | 2009-031848 | 2/2009 |
| JP | 2016-218633 | 12/2016 |
| WO | WO 2016/170386 | 10/2016 |
| WO | WO 2017/163220 | 9/2017 |
| WO | WO 2019/016954 | 1/2019 |

OTHER PUBLICATIONS

Kim et al., "Risk Management to Cryptocurrency Exchange and Investors Guidelines to Prevent Potential Threats", 2018 International Conference on Platform Technology and Service (PlatCon), Date of Conference: Jan. 29-31 (Year: 2018).*
Official Action for United Kingdom Patent Application No. GB1900670.9, dated Jul. 11, 2019 7 pages.
Piccolo "Distributed ledger technology in the capital market: Shared versus private information in a permissioned blockchain," Uppsala Universitet, Jul. 2017, Masters Thesis, 63 pages.
Buterin "Automated Censorship Attack Rejection," Ethereum Foundation, Aug. 15, 2017, 16 pages [retrieved online from: 517shangke.com/static/file/4236615_qq_com_1505927251814345.pdf].
Moriarty et al. "PKCS #12: Personal Information Exchange Syntax v1.1," IETF, Jul. 2014, RFC 7292, 29 pages.
"Blockchain," Shuwa System, Aug. 2017, 1st ed. pp. 106-107, 144-148.
Official Action with Machine Translation for Japan Patent Application No. 2019-008281, dated Jan. 16, 2020 12 pages.
"Whitepaper on Distributed Ledger Technology," ASTRI, Nov. 11, 2016, 98 pages.
Official Action with English Translation for Korea Patent Application No. 2019-0008312, dated May 21, 2020 15 pages.
Official Action for United Kingdom Patent Application No. GB1900670.9, dated Jul. 10, 2020 4 pages.
Official Action for United Kingdom Patent Application No. GB1900670.9, dated Nov. 18, 2020 4 pages.
Official Action with English Summary for Korea Patent Application No. 2019-0008312, dated Nov. 24, 2020 5 pages.
Sundararajan et al. "Online identity and authentication using Blockchain," Apr. 2017, 3 pages [retrieved online from: home.iitk.ac.in/~rsundar/cs498a/report.pdf].

* cited by examiner

METHODS AND DEVICES FOR DETECTING DENIAL OF SERVICE ATTACKS IN SECURE INTERACTIONS

FIELD

Example embodiments are directed toward methods and devices for detecting denial-of-service attacks in secure interactions, for example, between entities that desire to complete a blockchain operation.

BACKGROUND

The number of applications in which blockchain technology can be applied are growing. In some these applications, entities that desire to enter into a secure interaction with one another use a trusted third-party to facilitate/complete the interaction. Some protocols used to facilitate the interaction are subject to hacking attacks by a malicious entity. One such attack is a denial of service (DoS) attack in which the malicious entity overloads the trusted third-party with a large number of requests for assistance with a secure transaction.

SUMMARY

Example embodiments are directed toward methods and devices for detecting and preventing (or mitigating) attempted DoS attacks by providing a backward-compatible solution that establishes identifies via a trusted third-party for a given context using certificates (e.g., X.509v3 certificates). The certificates may be issued by the trusted third-party (e.g., a Certification Authority (CA)). After local verification by the CA, example embodiments may employ the PKCS #12 protocol (e.g., a combination of a private key and a X.509 certificate; a .pfx file) to secure interaction between entities. As is known in the computing arts, the PKCS #12 protocol defines an archive file format for storing many cryptography objects as a single file. It is commonly used to bundle a private key with its X.509 certificate or to bundle all the members of a chain of trust. A PKCS #12 file may be encrypted and signed. Thus, in accordance with at least some embodiments, the CA may establish identities of the entities, charge a nominal fee to one or more of the entities so that only the correct entities are allowed, and ignore requests of entities that have not paid the fee to reduce/prevent DoS attacks.

For example, identities of the entities may be established via a trusted third-party (i.e., the CA) for a given context using X.509v3 certificates. The certificates may be issued the CA, after local verification, using PKCS #12. Each entity generates a pair of mathematically tied random numbers with complex exponentiations to create a unique pair. One of the keys is kept private (i.e., the private key) with the generating entity and never copied, moved or stored outside of the entity. The other key (i.e., the public key) is, at the request of the entity, certified by a Registration Authority of the CA and returned in a certificate. The process is analogous to sending an application form and photos to a passport office and receiving a printed, signed, and sealed document in return.

Before proceeding with PKCS #12, one or more of the participating entities (e.g., the requesting entity) may perform an authenticated payment, which is considered as escrow. The payment may be in the form of one or more existing cryptocurrencies. The amount of the payment should deter/prevent a malicious entity from applying for a fake certificate. As one may appreciate, in the context of DoS attacks, the cumulative cost of thousands of requests from a malicious entity should prevent and/or deter such DoS attacks. Successful certification of the requesting entity by the CA may automatically complete the desired secure interaction (e.g., by paying all appropriate entities) and return the completed X.509v3 certificate to the requesting entity. No human interaction is required and a contract can be fulfilled.

The preceding example shows how a physical device may obtain registration, followed up by a system manager registration and provisioning. Example embodiments may also be used to obtain software copies, licenses, Virtual Machines (VMs), etc. A nominal pre-payment may be carried out via a purchase order, invoicing, etc., but no revenue recognition takes place until a set of rules established by the trusted third-party, mutually agreed upon by the participating entities, are met. At each stage of purchase, shipment, installation, registration, configuration, successful testing, and final activation, example embodiments allow immediate revenue recognition. That is, payment occurs automatically at the completion of each stage and all participating entities are satisfied. According at least one example embodiment, some amount of the escrow payment may remain in escrow for other purposes, such as warranties, insurance, etc.

Example embodiments provide error-free, legally binding, and automatic payments with immediate revenue recognition and an indisputable ledger of legal and/or financial events. In addition, example embodiments provide backward compatibility for identity integration of traditional PKI certificates (e.g., X.509v3 certificates) into blockchain technology and deters/prevents DoS attacks. As one may appreciate, the solution is fail close versus fail open, and supports existing infrastructures with Network Management, Security Incident, and Event Management.

BRIEF DESCRIPTION OF THE DRAWINGS

The present disclosure is described in conjunction with the appended Figures.

In the appended FIGS. 1-6, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In general, a blockchain is a distributed database that maintains a continuously growing list of data records that each refer to previous item on the list and is thus hardened against tampering and revision. The blockchain may be accessible/maintained by a trusted third-party or Certification Authority (CA). Additionally, or alternatively, the blockchain may be stored in a supplementary storage. The blockchain can continue to be modified as additional interactions are recorded. The blockchain may require a massive amount of data storage, but with the availability of cloud storage and massive data stores, the size of the blockchain is not problematic. The blockchain can be stored in multiple locations across a network, each location referred to as a node. As such, replicating the blockchain becomes virtually impossible.

In general, a denial of service (DoS) attack is a type of cyber-attack where a malicious entity attempts to make a machine or network resource unavailable to users of the machine or network resource by disrupting a host of the machine or network resource. DoS attacks are typically carried out by flooding the target host with bogus requests that overload the host and cause some or all legitimate requests from users to be denied or unfulfilled. A DoS attack may be carried out by a single entity or multiple entities.

Figure 1:
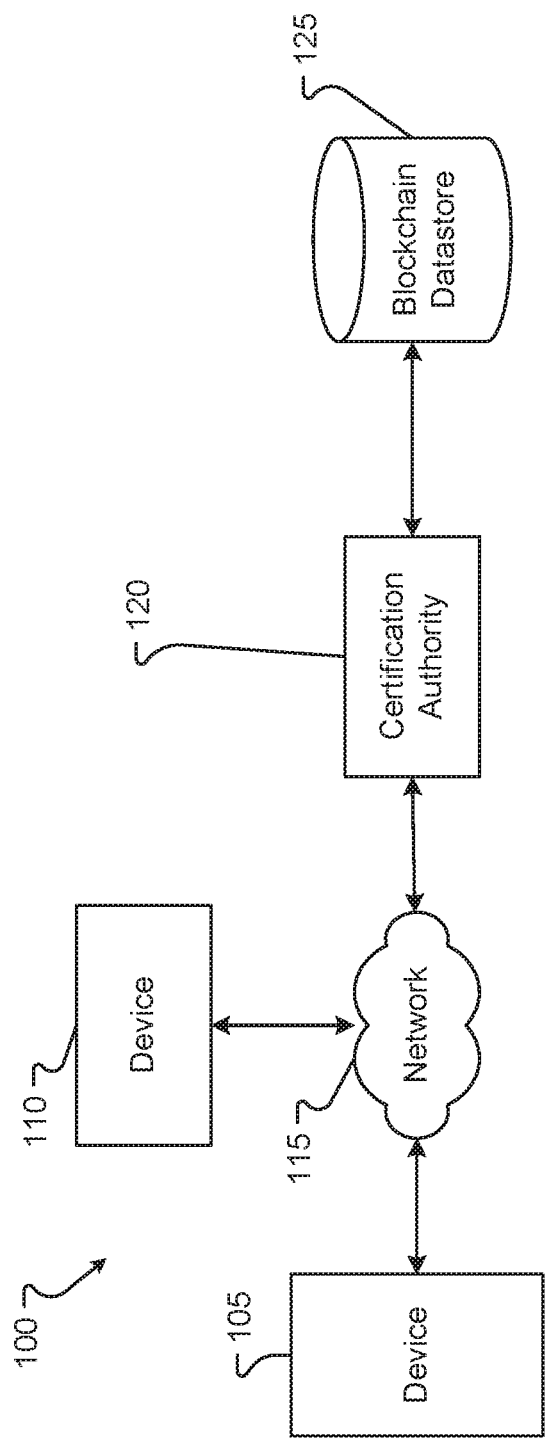
FIG. 1 depicts an embodiment of a system for conducting secure interactions according to at least one example embodiment.

FIG. 1 depicts an embodiment of a system 100 for conducting secure interactions according to at least one example embodiment.

FIG. 1 shows that the system 100 includes devices 105/110 a communications network (or network) 115, a Certification Authority (CA) 120 and a blockchain datastore 125. The CA 120 may be a trusted third-party entity that facilitates secure interactions for the devices 105 and 110. For example, the CA 120 may facilitate the secure transactions by receiving a request to facilitate a secure transaction between one device (e.g., 105) and another device (e.g., 110), sending a message back to the requesting device that includes a prompt for the requesting device to meet one or more conditions, and taking action to complete the requested secure transaction when the one or more conditions are met. As such, devices 105/110 may be associated with respective entities that belong to or are members of the CA. One real world example of a CA is the public blockchain platform called Ethereum. The devices 105/110 may be computer devices such as personal computers, mobile phones, and/or the like. The devices 105/110 and the CA 120 may be, merely by way of example, computing devices running various versions of Microsoft Corp.'s Windows® and/or Apple Corp.'s Macintosh® operating systems, and/or workstation computers running any of a variety of commercially-available UNIX® or UNIX-like operating systems. These devices 105/110 and CA 120 may also have any of a variety of applications, including for example, database client and/or server applications, and web browser applications. Alternatively, the devices 105/110 and CA 120 may be any other electronic device, such as a thin-client computer, Internet-enabled mobile telephone, and/or personal digital assistant, capable of communicating via a network 115 and/or displaying and navigating web pages or other types of electronic documents.

The network 115 may be any type of network that allows communication between the devices 105/110 and the CA 120. For example, the network 115 may be any type of network familiar to those skilled in the art that can support data communications using any of a variety of commercially-available protocols, including without limitation SIP, TCP/IP, SNA, IPX, AppleTalk, and the like. Merely by way of example, the network 115 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.9 suite of protocols, the Bluetooth® protocol known in the art, and/or any other wireless protocol); and/or any combination of these and/or other networks.

The devices 105/110 and the CA 120 exchange security information, such as blockchain information, through the network 115 as well as other messages.

The CA 120 is in communication with the blockchain datastore 125. The blockchain datastore 125 may be a collection of computer devices, such as a servers and/or user devices, that store one or more blockchains (or portions of information related to a blockchain). As such, the CA 120 may access the blockchain datastore 125 (or devices representing the blockchain datastore 125) on behalf of the devices 105/110 to facilitate a secure interaction (or event) between the devices 105/110. The datastore 125 may be one or more local and/or one or more remote storage servers and/or devices that the CA 120 accesses over a network (e.g., the network 115). The CA 120 may read and/or write information to the blockchain datastore 120 based on requests from and completed interactions between the devices 105/110.

Although not explicitly shown, it should be understood that the system 100 may include any number of devices and CAs in communication with one another over the network 115.

Figure 2:
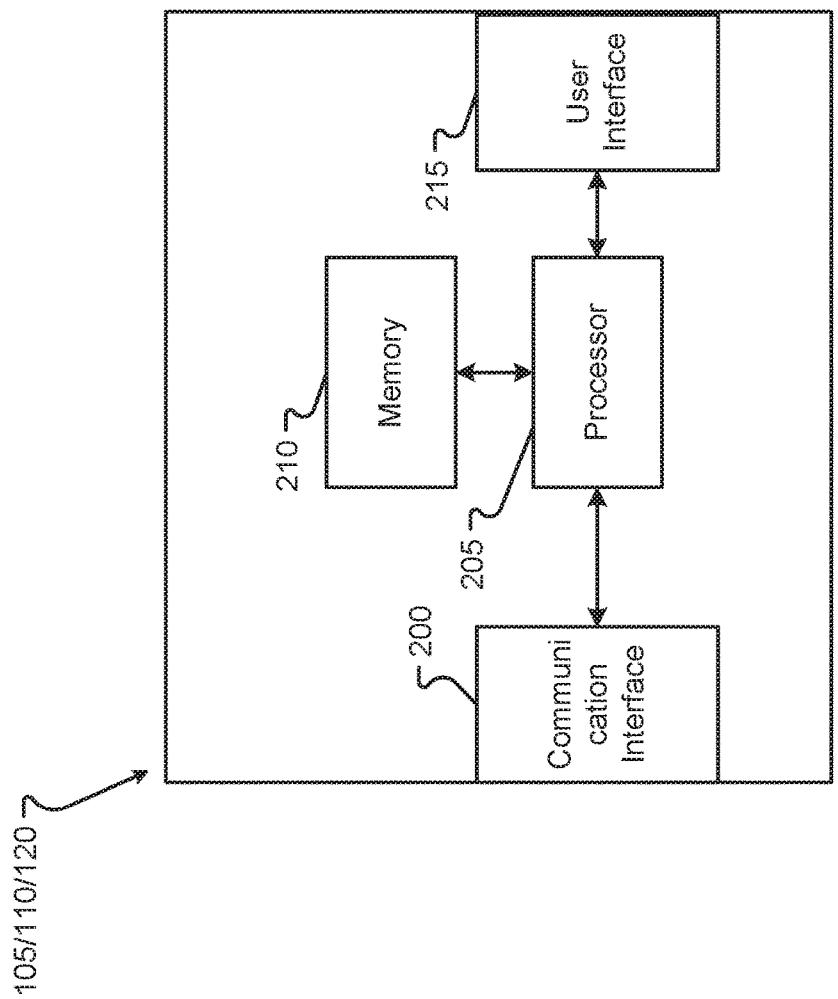
FIG. 2 is a block diagram of the devices and the Certification Authority shown in FIG. 1 according to at least one example embodiment.

FIG. 2 is a block diagram of the devices 105/110 and/or the CA 120 shown in FIG. 1 according to at least one example embodiment. In some embodiments, the devices 105/110 may correspond to user devices operated by a user whereas a device operated by the certification authority 120 may correspond to a server or similar type of device that does not necessarily have a highly-functional user interface in the same way that devices 105/110 have.

As shown in FIG. 2, each device 105/110 and the CA 120 may include at least one communication interface 200 for communicating over the network 115, a processor 205, a memory 210, and a user interface 215. The at least one communication interface 200 includes any necessary hardware and/or software for conducting wired and/or a wireless communication over the network 115. For example, the at least one interface 200 may include one or more interfaces that can handle traffic according to any of the aforementioned protocols and types of networks describe above with respect to network 115.

Each device 105/110 and the CA 120 may include a processor 205 in communication with the at least one communication interface 200, the memory 210 and the user interface 215 (e.g., over a bus). The memory 210 may represent one or more devices for storing data, including read only memory (ROM), random access memory (RAM), magnetic RAM, core memory, magnetic disk storage mediums, optical storage mediums, flash memory devices and/or other machine readable mediums for storing information. The memory 210 may be volatile and/or nonvolatile in nature, and stores instructions for causing the processor 205 to carry out various operations of the devices 105/110 and the CA 120 (see FIGS. 3, 5, and 6 for additional detail regarding example operations). Thus, the processor 205 may be one or more processors or microprocessors that executes the instructions on the memory 210 to carry out operations according to example embodiments. Examples of the processors 205 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

The user interface 215 may correspond to an interface that includes any necessary hardware and/or software to facilitate the display of information on displays associated the devices 105/110 and the CA 120. By way of example, the user interface 215 may be a Unified Display Interface (UDI), a Digital Video Interface (DVI), a High-Definition Multimedia Interface (HDMI), a composite video interface, a Mobile High-Definition Link (MHL) interface, Serial Digital Interface (SDI), and/or the like. The display(s) may be integrated or external to each device 105/110 and the CA 120. For example, if the devices 105/110 are mobile phones, then the display is integrated along with the user interface 215. If the devices 105/110 are personal desktop computers, then the displays may be external to and in communication with the user interface 215 (e.g., over an appropriate cable such as an HDMI cable).

Figure 3:
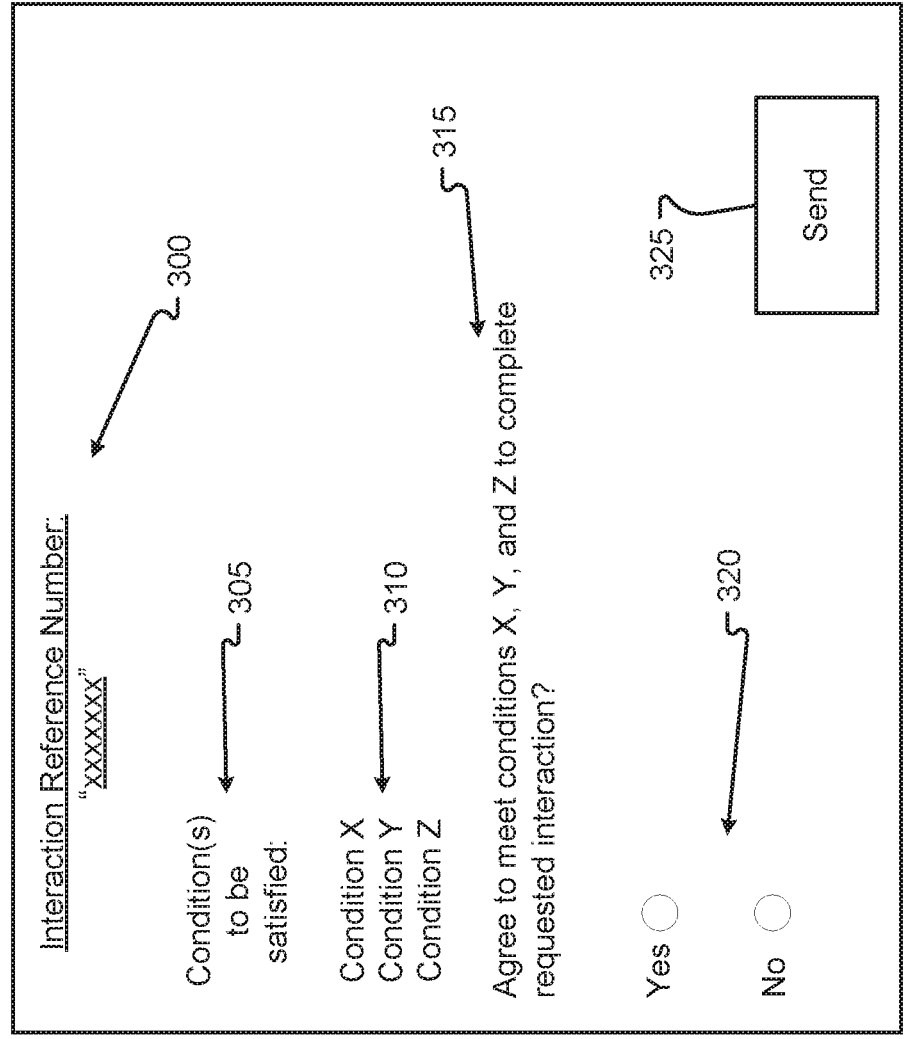
FIG. 3 is a diagram depicting an example of the user interface of FIG. 2 according to at least one example embodiment.

FIG. 3 is a diagram depicting an example of the user interface 215 of FIG. 2 according to at least one example embodiment. FIG. 3 assumes a case where a display of devices 105/110 are integrated with the user interface 215. However, as noted above, example embodiments are not limited thereto and the display may be external to the user interface 215. In more detail, FIG. 3 shows an example screenshot of what a user of a requesting device 105 or 110 sees upon receiving a response message from the CA 120 after requesting a secure interaction with another device 105 or 110 from the CA 120. Here, the request is a request for the CA 120 to facilitate an interaction between the requesting device (e.g., device 105) a providing device (e.g., device 110). It should be appreciated that FIGS. 5 and 6 and description thereof provide further context for FIG. 3.

As shown in FIG. 3, a response message (or prompt) from the CA 120 causes the requesting device 105/110 to display certain information to a user. This information includes a field for identifying the requested interaction 300, fields that indicate conditions to be satisfied 305/310, a query field 315, and selectable fields 320 and 325.

The field 300 may include an interaction reference number, which may be a unique sequence of numbers, letters, and/or other characters associated with the interaction or event requested by one of devices 105/110. The reference number may be assigned by the CA 120 upon receiving the request from device 105 or 110 and include information to identify the requested interaction to all entities participating in the interaction.

Fields 305/310 include information to identify one or more conditions to be satisfied by the requesting device 105 or 110 before the CA facilitates the requested interaction. Here, the conditions are indicated in field 310 as conditions X, Y, and Z. However, it should be understood that fewer of more conditions may be included as desired. According to at least one example embodiment, the one or more conditions X, Y, and Z may indicate some form of payment that must be made by the requesting device 105 or 110 to the CA 120. The CA 120 may consider the form of payment as escrow for completing the requested interaction.

The query field 315 may take the form of a question that asks the user of the requesting device 105 or 110 whether the user agrees to meet conditions listed in the field 310 in order to complete the requested interaction. The selectable field 320 may include selectable icons (e.g., circles or boxes) that indicate the user's answer to the question presented in the query field 315. In the example shown in FIG. 3, the selectable field 320 includes selectable "Yes" and "No" circles.

The selectable field 325 may include a clickable or user-selectable "Send" icon that causes the processor 205 of the requesting device 105 or 110 to send a message to the CA 120 that indicates whether the user of the requesting device 105 or 110 agrees to meet or has already met the conditions in field 310 for the requested interaction. According to at least one example embodiment, if the user has selected "Yes" in field 320, the message to the CA 120 may also serve as authorization to take the necessary steps to fulfill the conditions stated in field 310. For example, if field 310 indicates that the condition is payment of a sum of money by the requesting device 105 or 110 to the CA 120 (e.g., as escrow), selecting "Yes" in field 320 and clicking "Send" in field 325 may send a message to the CA that provides the CA 120 with automatic authorization to withdraw the agreed upon sum of money from a known account of the user of the requesting device 105 or 110. In another example, if the message from the requesting device 105 or 110 does not provide automatic authorization or if automatic authorization is not desirable for the condition(s), the message to the CA 120 may include a confirmation or other information to indicate that the condition(s) have been satisfied by the requesting device 105 or 110. That is, if the condition in field 310 is that the requesting device 105 or 110 place money into escrow, the requesting device 105 or 110 may subsequently ensure that the condition is met and provide an acceptable form of confirmation to the CA 120 in the message. The confirmation may include a deposit receipt or other similar type of proof attached to the message sent by the requesting device 105 or 110 to the CA 120. In yet another example, if the message from the requesting device 105 or 110 does not provide automatic authorization or if automatic authorization is not desirable for the condition(s), the requesting device 105 or 110 may receive one or more additional messages (e.g., from the CA 120 or other entities) that request authorization to carry out the condition(s).

Figure 4:
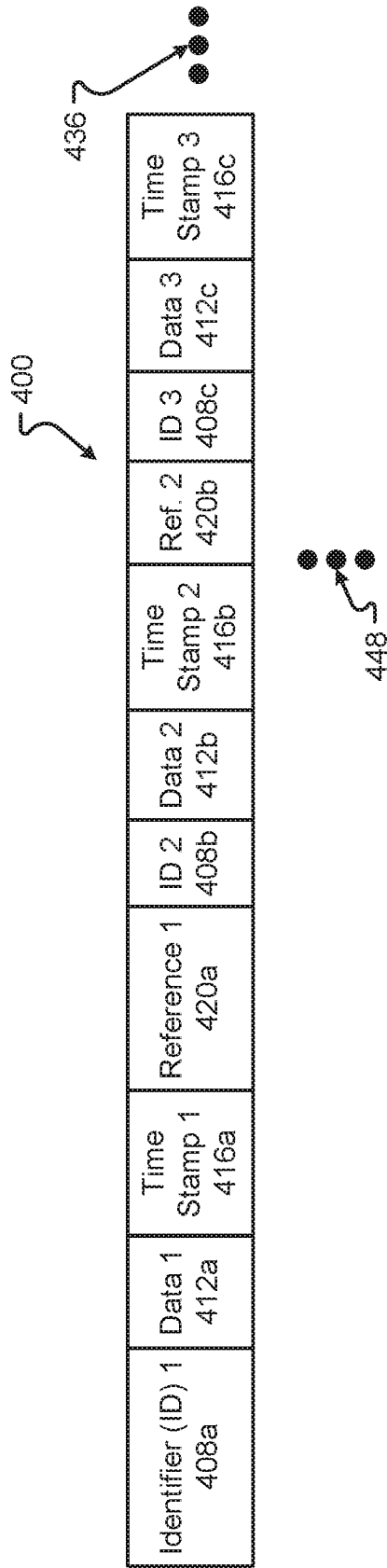
FIG. 4 is a diagram depicting a blockchain according to at least one example embodiment.

FIG. 4 is a diagram depicting a blockchain data structure according to at least one example embodiment. As described with reference to FIG. 1, the blockchain datastore 125 can be any type of data storage device or collection of data storage devices (e.g., memories maintained by servers, user devices, mobile devices, or combinations thereof) that are used to store one or more fields of information from the blockchain data structure. The blockchain datastore 125 may be used to store blockchains. This information may be accessible by the CA 120 for authentication of blockchains or for retrieval and transmission of the blockchains.

As shown in FIG. 4, a blockchain 400 may be a string of data. As demonstrated by the ellipsis 448, there may be more than one blockchain 400 in the datastore 125. Further, the blockchain 400 can include more or fewer fields than those shown in FIG. 4, as represented by ellipses 436. A blockchain 400 is generated from sets of interactions or events that have metadata recorded about them. For example, the blockchain 400 is created by at least three sets of events. Each event may include one or more of, but is not limited to, an identifier 408, data 412, and a timestamp 416. Further, blocks within the blockchain 400 that are recorded later than the first blockchain may also include a reference 420. Each of these different fields will be described hereinafter.

The identifiers (IDs) 408a,b,c (or IDs 408) may identify a particular interaction or event (e.g., between a requesting device 105 and a providing device 110). Thus, the IDs 408 can be any type of globally unique identifier (GUID), alphanumeric identifier, etc. Each identifier 408 is unique to the particular block within the blockchain 400. This ID 408 may increment or may be created separately each time a new block is added to the blockchain 400.

Data 412a,b,c (or data 412) includes data about the interaction or event. For example, a blockchain data item 412 can include information about the type of interaction or event completed by the CA 120 (e.g., information that identifies the event as an exchange of money, an exchange of money for goods or services, etc.). The data 412 may be stored as either encrypted or unencrypted data. The data 412 is also associated with a timestamp 416.

The timestamps 416a,b,c (or timestamp 416) records the date and/or time which the interaction occurred. As such, between the data 412 and timestamp 416, several items of information or characteristics of each interaction are recorded. This information represents a profile that is unmistakable and unduplicatable. As the number of interactions grow, the blockchain 400 grows.

As a new block is added (where a block includes the ID 408, the data 412, and the time stamp 416), a new field is added to the new block. This new field, the reference 420, is a reference back to the block immediately preceding the new data in the blockchain 400. For example, reference 1 420a refers back to ID 1 408A. Reference 2 420b refers back to ID 2 408b. Thus, as the blocks are built, the blocks are chained together by references 420 to the previous block ID 408. The blockchain 400 grows as each block is added with a new reference 420 to the previous block.

Figure 5:
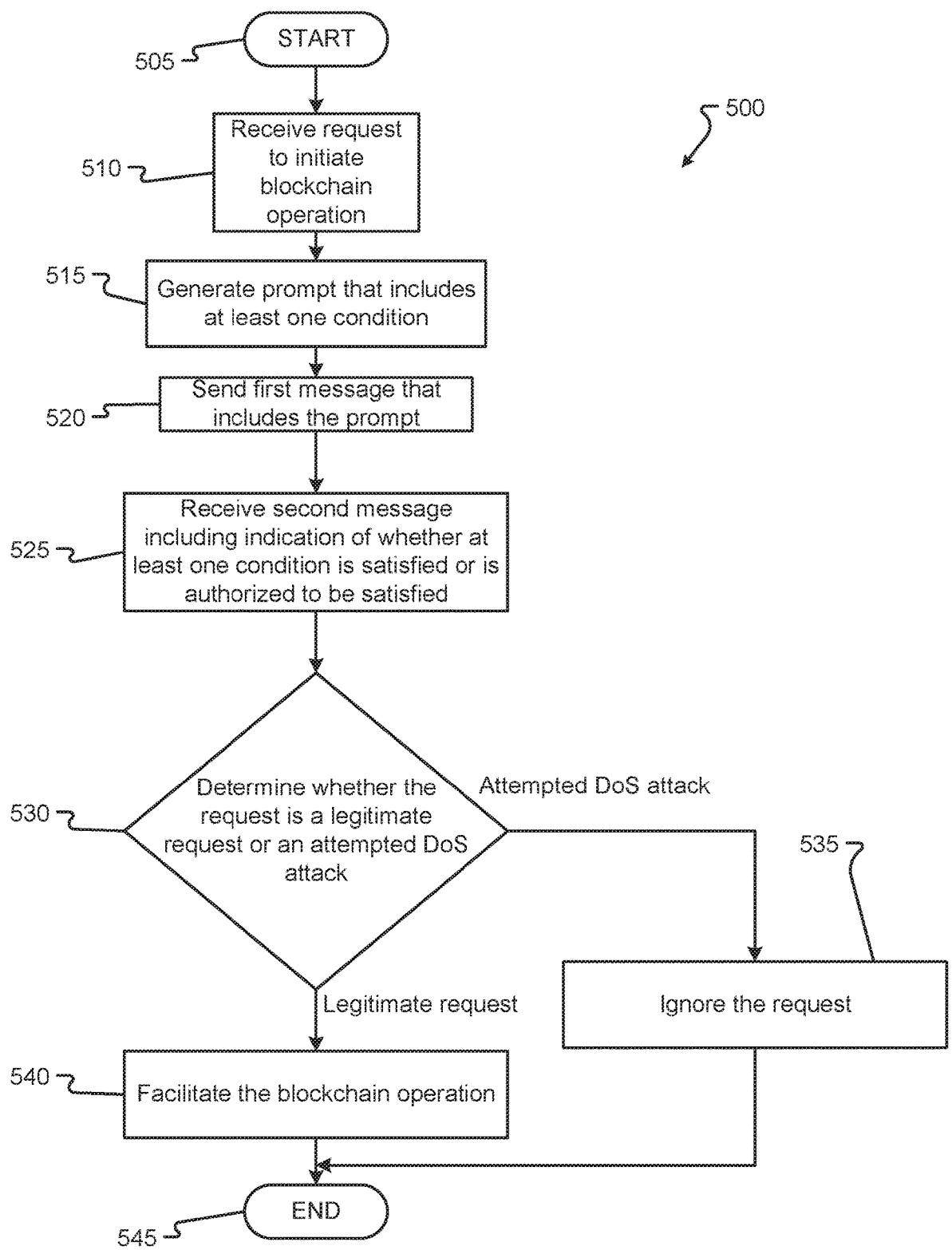
FIG. 5 illustrates an example method for the system in FIG. 1 according to at least one example embodiment.

FIG. 5 illustrates an example method 500 for the system 100 in FIG. 1 according to at least one example embodiment.

While a general order for the steps of the method 500 is shown in FIG. 5, the method 500 can include more or fewer steps or can arrange the order of the steps differently than those shown in FIG. 5. Generally, the method 500 starts at operation 505 and ends at operation 545. The method can be executed as a set of computer-executable instructions executed by the processor 205 of the CA 120 and encoded or stored on a computer readable medium (e.g., memory 210 of the CA 120). Alternatively, the operations discussed with respect to FIG. 5 may be implemented by other various elements of FIGS. 1-3. Hereinafter, the FIG. 5 shall be explained with reference to the systems, components, assemblies, devices, user interfaces, environments, software, etc. described in conjunction with FIGS. 1-4.

In operation 510, the method 500 includes receiving a request from a first entity (e.g., device 105) to initiate a blockchain operation on behalf of the first entity 105 and a second entity (e.g., device 110). According to at least one example embodiment, the blockchain operation includes accessing the blockchain 400 and adding a block to the blockchain 400 and/or reading blocks of the blockchain 400.

In operation 515, the method 500 includes generating a prompt including at least one condition (e.g., from field 310 in FIG. 3) that is associated with the blockchain operation. The generating may be performed in response to receiving the request in operation 510. Here, the at least one condition may be determined based on first information received from the second entity 110. The first information may include at least one preference of the second entity 110 for setting the at least one condition. The at least one preference may include type and/or amount of payment that the CA 120 should request from the first entity 105 as escrow. The at least one condition may be determined based on the first information and second information relating to a likelihood that the at least one condition provides a deterrent to executing the DoS attack. The second information may be a design parameter set based on empirical evidence and or preference. For example, the CA 120 may calculate such a likelihood based on based on a log of previously completed blockchain operations with associated conditions. The log may include information indicating of whether certain conditions used for previous interactions between entities were sufficient to deter a DoS attack, which can be used to set current conditions.

According to at least one example embodiment, the at least one condition includes a form of payment by the first entity 105. The form of payment may be unauthenticated. For example, the form of payment may be an unauthenticated deposit of a predetermined sum of money (e.g., cryptocurrency) into an escrow account visible by the CA 120.

In operation 520, the method 500 includes sending a first message that acknowledges the request to the first entity 105. The first message includes the prompt (which may be displayed to a user of the first entity 105 as shown in FIG. 3).

In operation 525, the method 500 includes receiving a second message. The second message may be from the first entity 105 and/or from some other entity that the first entity 105 has designated to act on the first entity's behalf. The second message includes an indication of whether the at least one condition from field 310 has been satisfied or is authorized to be satisfied. As noted above, the second message may be sent by the first entity 105 and the indication may include a confirmation that the condition is satisfied and/or an authorization for the CA 120 to satisfy the condition on behalf of the first entity 105. In another example, the second message may be sent to the CA 120 by some other entity on behalf of the first entity 105 to indicate that the first entity 105 has met the at least one condition.

In operation 530, the method 500 includes determining whether the request from the first entity 105 is attempting the DoS attack or is issuing a legitimate request to initiate the blockchain operation based on the indication in the second message. The DoS attack may be detected when the determining indicates that the at least one condition of the prompt has not been satisfied or is not authorized to be satisfied. The DoS attack may also be detected if a desired amount of time has passed since the CA 120 sent the first message that included the prompt with the at least one condition. The amount of time may be a design parameter set based on empirical evidence and/or preference.

If operation 530 determines that the first entity 105 is attempting a DoS attack, the method 500 proceeds to operation 535 and ignores the request. In the interests of conserving network resources, operation 535 may include ignoring all subsequent requests from the first entity 105 for a predetermined time period. Here, network resources are conserved as a result of no first messages having to be generated and sent to the first entity 105 for the predetermined time period. The predetermined time period may be a design parameter set based on empirical evidence or preference.

If, in operation 530, the method 500 determines that the request is a legitimate request, the method 500 proceeds to operation 540 which includes facilitating the blockchain operation requested by the first entity 105 upon satisfaction of the at least one condition. A legitimate request may be determined in operation 530 if the second message indicates that the at least one condition has been met or is authorized to be met.

In operation 540, facilitating the blockchain operation may include various authentication procedures (e.g., generating X.509v3 certificates using PKCS #12 protocol). For example, facilitating may include receiving a first public key generated by the first entity 105, receiving a second public key generated by the second entity 110, generating a first certificate based on the first public key, generating a second certificate based on the second public key, and sending the first certificate and the second certificate to the first entity 105 and the second entity 110, respectively. These certificates represent successful completion of the interaction by the CA 120 on behalf of the first entity 105 and the second entity 120.

In view of the example operations shown in FIG. 5, it should be understood that example embodiments are directed to a device (e.g., CA 120) for preventing a DoS attack on a network 115. The CA 120 may include at least one interface 200, a memory 210 including instructions, and a processor 205 that executes the instructions to generate, in response to receiving a request from a first entity 105 to initiate a blockchain operation on behalf of the first entity 105 and a second entity 110, a prompt including at least one condition that is associated with the blockchain operation. The CA 120 may send, to the first entity 105 via the at least one interface 200, a first message that acknowledges the request. The first message includes the prompt. The CA 120 receives, via the at least one interface 200, a second message (e.g., from the first entity 105). The second message includes an indication of whether the at least one condition has been satisfied or is authorized to be satisfied. The CA 120 determines whether the request from the first entity 105 is attempting the DoS attack or is issuing a legitimate request to initiate the blockchain operation based on the indication. The CA 120 facilitates the blockchain operation upon satisfaction of the at least condition.

As noted above, the at least one condition may be determined based on first information and/or second information the same as that described above with reference to FIG. 5. Further, the CA 120 may store at least one of the first information and the second information on the memory 210.

Figure 6:
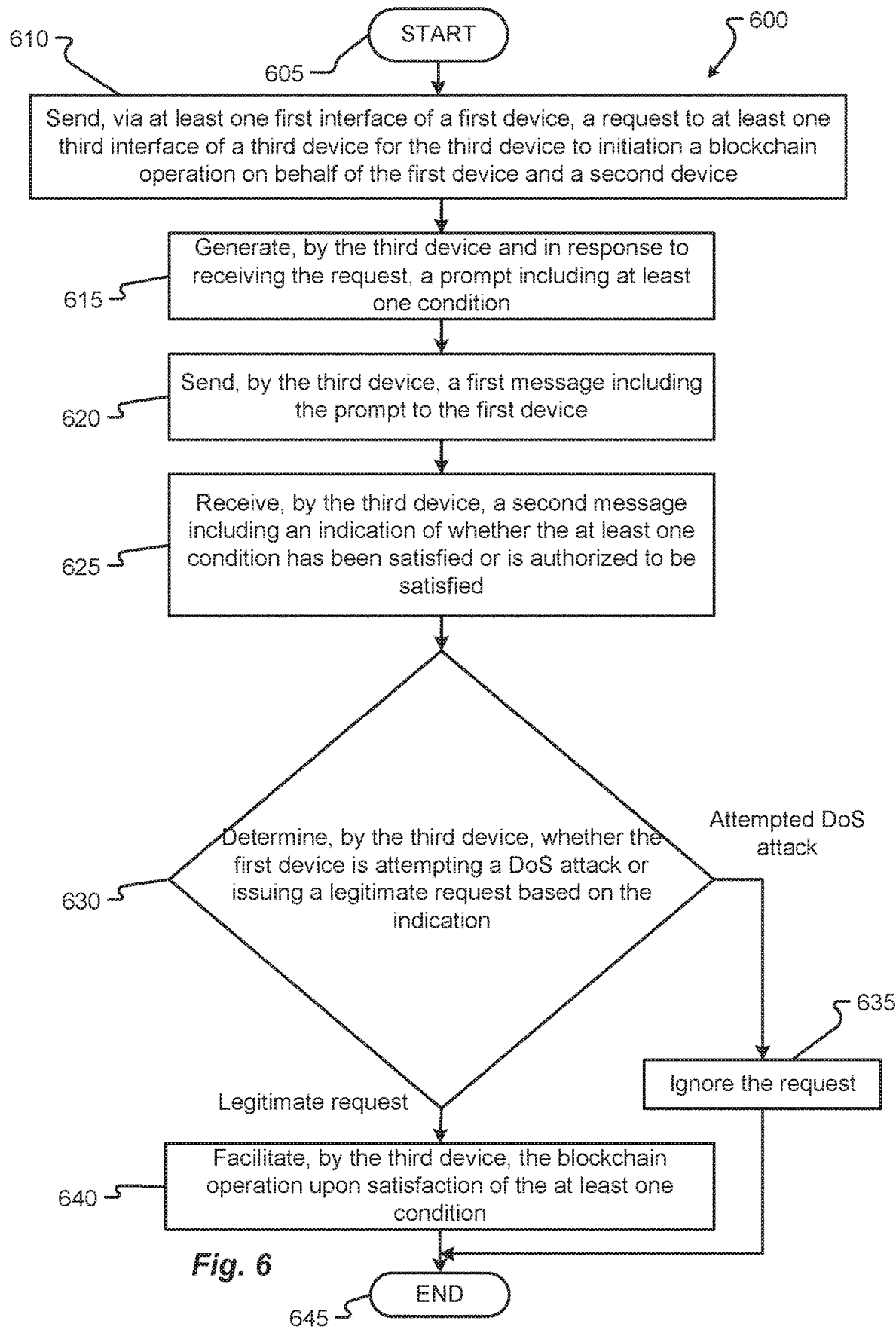
FIG. 6 illustrates an example method for the system in FIG. 1 according to at least one example embodiment.

FIG. 6 illustrates an example method 600 for the system 100 in FIG. 1 according to at least one example embodiment.

While a general order for the steps of the method 600 is shown in FIG. 6, the method 600 can include more or fewer steps or can arrange the order of the steps differently than those shown in FIG. 6. Generally, the method 600 starts at operation 605 and ends at operation 645. The method can be executed as a set of computer-executable instructions executed by respective processors 205 of the devices 105/110 and/or the CA 120 and encoded or stored on a computer readable medium (e.g., respective memories 210). Alternatively, the operations discussed with respect to FIG. 6 may be implemented by other various elements of FIGS. 1-3. Hereinafter, the FIG. 6 shall be explained with reference to the systems, components, assemblies, devices, user interfaces, environments, software, etc. described in conjunction with FIGS. 1-5.

For the sake of explanation, FIG. 6 is described with respect to a system that includes a first device (e.g., device 105) including at least one first interface (e.g., communication interface 200 of the device 105), a second device (e.g., device 110) including at least one second interface (e.g., communication interface 200 of the device 110), and a third device (e.g., CA 120) including at least one third interface (e.g., communication interface 200 of the CA 120).

In operation 610, the method 600 includes the first device 105 sending, via the at least one first interface, a request to the at least one third interface for the third device 120 to initiate a blockchain operation on behalf of the first device 105 and the second device 110.

In operation 615, the method 600 includes the third device 120 generating, in response to receiving the request, a prompt including at least one condition that is associated with the blockchain operation. According to at least one example embodiment, the third device 120 generates information relating to a likelihood that the at least one condition provides a deterrent to executing the denial of service attack based on a log of previously completed blockchain operations that had associated conditions, and determines the at least one condition based on the information. In at least one example embodiment, the at least one condition is a form of unauthenticated payment by the first device 105 to the third device 120. According to at least one example embodiment, the third device 120 determines the at least one condition based on the information received from the second device 110. The information including at least one preference of the second device 110 for setting the at least one condition.

In operation 620, the method 600 includes the third device 120 sending, via the at least one third interface, a first message to the at least one first interface that acknowledges the request. The first message includes the prompt.

In operation 625, the method 600 includes the third device 120 receiving, via the at least one third interface, a second message. The second message includes an indication of whether the at least one condition has been satisfied or is authorized to be satisfied.

In operation 630, the method 600 includes the third device 120 determining whether the request from the first device is attempting the denial of service attack or is issuing a legitimate request to initiate the blockchain operation based on the indication from operation 625.

If operation 630 determines that the first device 105 is attempting the denial of service attack, the method 600 proceeds to operation 635, and the third device 120 ignores the request. The denial of service attack may be detected in a same manner as that described above with respect to FIG. 5 (e.g., when the determining indicates that the at least one condition of the prompt has not been satisfied or is not authorized to be satisfied).

If operation 630 determines that the request is a legitimate request, the method 600 proceeds to operation 640, and the third device 120 facilitates the blockchain operation upon satisfaction of the at least one condition. The request may be determined to be a legitimate request in the same manner as that described above with respect to FIG. 5.

Any of the steps, functions, and operations discussed herein can be performed continuously and automatically.

In view of the foregoing, it should be appreciated that example embodiments provide methods and devices for detecting and preventing DoS attacks in the context of a first entity (e.g., a buyer) requesting a trusted third party to carry out a blockchain operation on behalf of the first entity and a second entity (e.g., a seller). For example, such attacks can be detected/prevented by requesting a nominal pre-payment from a requesting entity as a type of escrow that serves as an indication that the requesting entity is submitting a legitimate request. These and other advantages should be apparent from the disclosure contained herein.

The exemplary systems and methods of this disclosure have been described in relation to conducting secure interactions between devices. However, to avoid unnecessarily obscuring the present disclosure, the preceding description may omit a number of known structures and devices. This omission is not to be construed as a limitation of the scope of the claimed disclosure. Specific details are set forth to provide an understanding of the present disclosure. It should however be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device (s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the disclosure.

The phrases "at least one", "one or more", "or", and "and/or" are open-ended expressions that are both conjunctive and disjunctive in operation. For example, each of the expressions "at least one of A, B and C", "at least one of A, B, or C", "one or more of A, B, and C", "one or more of A, B, or C", "A, B, and/or C", and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The terms "determine", "calculate" and "compute," and variations thereof, as used herein, are used interchangeably and include any type of methodology, process, mathematical operation or technique.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

The preceding is a simplified summary to provide an understanding of some aspects of the disclosure. This summary is neither an extensive nor exhaustive overview of the disclosure and its various embodiments. It is intended neither to identify key or critical elements of the disclosure nor to delineate the scope of the disclosure but to present selected concepts of the disclosure in a simplified form as an introduction to the more detailed description presented below. As will be appreciated, other embodiments of the disclosure are possible utilizing, alone or in combination, one or more of the features set forth above or described in detail below. Also, while the disclosure is presented in terms of exemplary embodiments, it should be appreciated that individual aspects of the disclosure can be separately claimed.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease and\or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights which include alternative embodiments, configurations, or aspects to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

At least one example embodiment is directed to a method of preventing a denial of service attack on a network. The method comprises receiving a request from a first entity to initiate a blockchain operation on behalf of the first entity and a second entity; generating, in response to receiving the request, a prompt including at least one condition that is associated with the blockchain operation; sending a first message that acknowledges the request to the first entity, the first message including the prompt; receiving a second message, the second message including an indication of whether the at least one condition has been satisfied or is authorized to be satisfied; determining whether the request from the first entity is attempting the denial of service attack or is issuing a legitimate request to initiate the blockchain operation based on the indication; and facilitating the blockchain operation upon satisfaction of the at least one condition.

According to at least one example embodiment, the method further comprises determining the at least one condition based on first information received from the second entity.

According to at least one example embodiment, the determining includes determining the at least one condition based on the first information and second information relating to a likelihood that the at least one condition provides a deterrent to executing the denial of service attack.

According to at least one example embodiment, the at least one condition includes a form of payment by the first entity.

According to at least one example embodiment, the form of payment is unauthenticated.

According to at least one example embodiment, the blockchain operation includes accessing a blockchain; and adding a block to the blockchain.

According to at least one example embodiment, the facilitating includes receiving a first public key generated by the first entity; receiving a second public key generated by the second entity; generating a first certificate based on the first public key; generating a second certificate based on the second public key; and sending the first certificate and the second certificate to the first entity and the second entity, respectively.

According to at least one example embodiment, the method further comprises ignoring the request from the first entity when the determining indicates that the at least one condition of the prompt has not been satisfied or is not authorized to be satisfied.

At least example embodiment is directed to a device for preventing a denial of service attack on a network includes at least one interface; a memory including instructions; and a processor that executes the instructions to: generate, in response to receiving a request from a first entity to initiate a blockchain operation on behalf of the first entity and a second entity, a prompt including at least one condition that is associated with the blockchain operation; send, to the first entity via the at least one interface, a first message that acknowledges the request, the first message including the prompt; receive, via the at least one interface, a second message, the second message including an indication of whether the at least one condition has been satisfied or is authorized to be satisfied; determine whether the request from the first entity is attempting the denial of service attack or is issuing a legitimate request to initiate the blockchain operation based on the indication; and facilitate the blockchain operation upon satisfaction of the at least one condition.

According to at least one example embodiment, the instructions include instructions to cause the processor to generate first information relating to a likelihood that the at least one condition provides a deterrent to executing the denial of service attack based on a log of previously completed blockchain operations with associated conditions, and to determine the at least one condition based on the first information.

According to at least one example embodiment, the instructions include instructions to cause the processor to determine the at least one condition based on the first information and second information received from the second entity, the second information including at least one preference of the second entity for setting the at least one condition.

According to at least one example embodiment, the instructions include instructions to cause the processor to store at least one of the first information and the second information on the memory.

According to at least one example embodiment, the at least one condition includes a form of payment by the first entity.

According to at least one example embodiment, the form of payment is unauthenticated.

According to at least one example embodiment, the instructions include instructions to cause the processor to facilitate the blockchain operation by accessing a blockchain; and adding a block to the blockchain.

According to at least one example embodiment, the instructions include instructions to cause the processor to facilitate the blockchain operation by: receiving, via the at least one interface, a first public key generated by the first entity; receiving, via the at least one interface, a second public key generated by the second entity; generating a first certificate based on the first public key; generating a second certificate based on the second public key; and sending, via the at least one interface, the first certificate and the second certificate to the first entity and the second entity, respectively.

According to at least one example embodiment, the instructions include instructions to cause the processor to ignore the request from the first entity when the determining indicates that the at least one condition of the prompt has not been satisfied or is not authorized to be satisfied.

At least one example embodiment is directed to a system for preventing a denial of service attack on a network, the system comprising: a first device including at least one first interface; a second device including at least one second interface; and a third device including at least one third interface. The first device sends, via the at least one first interface, a request to the at least one third interface for the third device to initiate a blockchain operation on behalf of the first device and the second device; the third device generates, in response to receiving the request, a prompt including at least one condition that is associated with the blockchain operation; the third device sends, via the at least one third interface, a first message to the at least one first interface that acknowledges the request, the first message including the prompt; the third device receives, via the at least one third interface, a second message, the second message including an indication of whether the at least one condition has been satisfied or is authorized to be satisfied; the third device determines whether the request from the first device is attempting the denial of service attack or is issuing a legitimate request to initiate the blockchain operation based on the indication; the third device facilitates the blockchain operation upon satisfaction of the at least one condition; and the third device ignores the request when the determining indicates that the at least one condition of the prompt has not been satisfied or is not authorized to be satisfied.

According to at least one example embodiment, the third device generates information relating to a likelihood that the at least one condition provides a deterrent to executing the denial of service attack based on a log of previously completed blockchain operations that had associated conditions, and determines the at least one condition based on the information. The at least one condition is a form of unauthenticated payment by the first device to the third device.

According to at least one example embodiment, the third device determines the at least one condition based on the information received from the second entity, the information including at least one preference of the second entity for setting the at least one condition. The at least one condition is a form of unauthenticated payment by the first device to the third device.

What is claimed is:

1. A method of preventing a denial of service attack on a network, the method comprising:
receiving a request from a first entity to initiate a blockchain operation on behalf of the first entity and a second entity, wherein the request is received by a certificate authority (CA) different form the first entity and second entity;
generating, by the CA and in response to receiving the request, a prompt including at least one condition that is associated with the blockchain operation, wherein the at least one condition is presented by the first entity to receive a response to the at least one condition;

sending a first message that acknowledges the request to the first entity, the first message including the prompt;
receiving a second message, the second message including an indication of whether the at least one condition has been satisfied or is authorized to be satisfied comprising the response to the at least one condition received by the first entity;
denying the request, upon determining that the request from the first entity is attempting the denial of service attack, or approving the request, upon determining the first entity is issuing a legitimate request to initiate the blockchain operation based on the indication; and
approving the request further comprising initiating the blockchain operation, upon determining that the at least one condition has been satisfied.

2. The method of claim 1, further comprising:
determining the at least one condition based on first information received from the second entity.

3. The method of claim 2, wherein the determining includes determining the at least one condition based on the first information and second information relating to a likelihood that the at least one condition provides a deterrent to executing the denial of service attack.

4. The method of claim 3, wherein the at least one condition includes a form of payment by the first entity.

5. The method of claim 4, wherein the form of payment is unauthenticated.

6. The method of claim 1, wherein the blockchain operation includes:
accessing a blockchain; and
adding a block to the blockchain.

7. The method of claim 6, further comprising:
receiving a first public key generated by the first entity;
receiving a second public key generated by the second entity;
generating a first certificate based on the first public key;
generating a second certificate based on the second public key; and
sending the first certificate and the second certificate to the first entity and the second entity, respectively.

8. The method of claim 1, wherein:
denying the request comprises ignoring the request from the first entity when the determining indicates that the at least one condition of the prompt has not been satisfied or is not authorized to be satisfied.

9. A device for preventing a denial of service attack on a network, the device comprising:
at least one interface;
a memory including instructions; and
a processor that executes the instructions to:
generate, by a certificate authority (CA) in response to receiving a request by the CA from a first entity to initiate a blockchain operation on behalf of the first entity and a second entity different from the CA, a prompt including at least one condition that is associated with the blockchain operation, wherein the at least one condition is presented by the first entity to receive a response to the at least one condition;
send, to the first entity via the at least one interface, a first message that acknowledges the request, the first message including the prompt;
receive, via the at least one interface, a second message, the second message including an indication of whether the at least one condition has been satisfied or is authorized to be satisfied comprising the response to the at least one condition received by the first entity;
denying the request, upon determining that the request from the first entity is attempting the denial of service attack, or approving the request, upon determining the first entity is issuing a legitimate request to initiate the blockchain operation based on the indication; and
approving the request further comprising initiating the blockchain operation, upon determining that the at least one condition has been satisfied.

10. The device of claim 9, wherein the instructions include instructions to cause the processor to generate first information relating to a likelihood that the at least one condition provides a deterrent to executing the denial of service attack based on a log of previously completed blockchain operations with associated conditions, and to determine the at least one condition based on the first information.

11. The device of claim 10, wherein the instructions include instructions to cause the processor to determine the at least one condition based on the first information and second information received from the second entity, the second information including at least one preference of the second entity for setting the at least one condition.

12. The device of claim 11, wherein the instructions include instructions to cause the processor to store at least one of the first information and the second information on the memory.

13. The device of claim 11, wherein the at least one condition includes a form of payment by the first entity.

14. The device of claim 12, wherein the form of payment is unauthenticated.

15. The device of claim 10, wherein the instructions include instructions to cause the processor to facilitate the blockchain operation by:
accessing a blockchain; and
adding a block to the blockchain.

16. The device of claim 10, wherein the instructions include instructions to cause the processor to facilitate the blockchain operation by:
receiving, via the at least one interface, a first public key generated by the first entity;
receiving, via the at least one interface, a second public key generated by the second entity;
generating a first certificate based on the first public key;
generating a second certificate based on the second public key; and
sending, via the at least one interface, the first certificate and the second certificate to the first entity and the second entity, respectively.

17. The device of claim 10, wherein the instructions to deny the request comprise instructions to cause the processor to ignore the request from the first entity when the determining indicates that the at least one condition of the prompt has not been satisfied or is not authorized to be satisfied.

18. A system for preventing a denial of service attack on a network, the system comprising:
a first device including at least one first interface;
a second device including at least one second interface; and
a third device including at least one third interface, wherein:
the first device sends, via the at least one first interface, a request to the at least one third interface for the third device to initiate a blockchain operation on behalf of the first device and the second device, wherein the third device is different from the first device and the second device;

the third device generates, in response to receiving the request, a prompt including at least one condition that is associated with the blockchain operation, wherein the at least one condition is presented by a first entity to receive a response to the at least one condition;

the third device sends, via the at least one third interface, a first message to the at least one first interface that acknowledges the request, the first message including the prompt;

the third device receives, via the at least one third interface, a second message, the second message including an indication of whether the at least one condition has been satisfied or is authorized to be satisfied comprising the response to the at least one condition received by the first entity;

the third device denies the request upon determining that the request from the first device is attempting the denial of service attack or approves the request upon determining the first device is issuing a legitimate request to initiate the blockchain operation based on the indication;

the third device approves the request further comprising initiating the blockchain operation, upon determining that the at least one condition has been satisfied; and the third device denies the request further comprising ignoring the request upon determining that the at least one condition of the prompt has not been satisfied or is not authorized to be satisfied.

19. The system of claim 18, wherein the third device generates information relating to a likelihood that the at least one condition provides a deterrent to executing the denial of service attack based on a log of previously completed blockchain operations that had associated conditions, and determines the at least one condition based on the information, wherein the at least one condition is a form of unauthenticated payment by the first device to the third device.

20. The system of claim 18, wherein the third device determines the at least one condition based on the information received from a second entity, the information including at least one preference of the second entity for setting the at least one condition, wherein the at least one condition is a form of unauthenticated payment by the first device to the third device.

* * * * *